United States Patent
Chiashi (10) Patent No.: US 10,394,366 B2
(45) Date of Patent: Aug. 27, 2019

(54) TERMINAL DEVICE, DISPLAY CONTROL METHOD, AND PROGRAM

(71) Applicant: NEC CASIO MOBILE COMMUNICATIONS, LTD., Kanagawa (JP)

(72) Inventor: Eiji Chiashi, Kawasaki (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/407,078

(22) PCT Filed: Jun. 25, 2013

(86) PCT No.: PCT/JP2013/067401
§ 371 (c)(1),
(2) Date: Dec. 11, 2014

(87) PCT Pub. No.: WO2014/003012
PCT Pub. Date: Jan. 3, 2014

(65) Prior Publication Data
US 2015/0160775 A1    Jun. 11, 2015

(30) Foreign Application Priority Data

Jun. 29, 2012  (JP) ................................ 2012-146661

(51) Int. Cl.
*G06F 1/16* (2006.01)
*G06F 3/14* (2006.01)
(Continued)

(52) U.S. Cl.
CPC .......... *G06F 3/0416* (2013.01); *G06F 1/1616* (2013.01); *G06F 1/1626* (2013.01);
(Continued)

(58) Field of Classification Search
None
See application file for complete search history.

(56) References Cited

U.S. PATENT DOCUMENTS 8,484,559 B2   7/2013  Kanai
8,547,358 B2   10/2013 Homma et al.
(Continued)

FOREIGN PATENT DOCUMENTS

CN   1504923     6/2004
CN   101640762   2/2010
(Continued)

OTHER PUBLICATIONS

International Search Report—PCT/JP2013/067401—dated Sep. 24, 2013.

(Continued)

*Primary Examiner* — Amr A Awad
*Assistant Examiner* — Maheen I Javed
(74) *Attorney, Agent, or Firm* — Young & Thompson (57) ABSTRACT

A terminal device is provided that makes it possible to improve operability when a plurality of image data items are associated with a single character data item and displayed. This terminal device is provided with: a first display unit that displays main information on an upper layer, and displays attachment information that is associated with the main information on a lower layer underlying the main information; a first input unit that detects an operation that is input into a front surface side of the first display unit; a second input unit that is located on a rear surface side of the first display unit, and detects an input operation; and a control unit that, when the second input unit detects the operation, processes the attachment information that is displayed on the first display unit in accordance with the operation detected by the second input unit.

11 Claims, 6 Drawing Sheets

(51) Int. Cl.
*G06F 3/041* (2006.01)
*G06F 3/0484* (2013.01)
*G06F 3/0488* (2013.01)
*G06F 3/038* (2013.01)
*G06F 11/16* (2006.01)

(52) U.S. Cl.
CPC ............ *G06F 1/1647* (2013.01); *G06F 3/038* (2013.01); *G06F 3/041* (2013.01); *G06F 3/0484* (2013.01); *G06F 3/0488* (2013.01); *G06F 3/04883* (2013.01); *G06F 3/04886* (2013.01); *G06F 3/1431* (2013.01); *G06F 2203/0382* (2013.01); *G06F 2203/04803* (2013.01)

(56) References Cited

U.S. PATENT DOCUMENTS

| | | | |
|---|---|---|---|
| 8,847,977 | B2 | 9/2014 | Ozawa et al. |
| 2002/0118175 | A1* | 8/2002 | Liebenow ............ G06F 1/1626 345/168 |
| 2004/0135813 | A1 | 7/2004 | Kanai |
| 2007/0188450 | A1 | 8/2007 | Hernandez et al. |
| 2009/0042619 | A1* | 2/2009 | Pierce ................ G02F 1/13338 455/566 |
| 2009/0164287 | A1 | 6/2009 | Kies et al. |
| 2009/0167696 | A1 | 7/2009 | Griffin |
| 2010/0026719 | A1* | 2/2010 | Ozawa ................ G06F 3/0483 345/650 |
| 2010/0037183 | A1 | 2/2010 | Miyashita et al. |
| 2010/0056220 | A1 | 3/2010 | Oh et al. |
| 2010/0103136 | A1 | 4/2010 | Ono et al. |
| 2010/0277439 | A1 | 11/2010 | Charlier et al. |
| 2011/0012921 | A1 | 1/2011 | Cholewin et al. |
| 2011/0074716 | A1 | 3/2011 | Ono |
| 2011/0107226 | A1* | 5/2011 | Heo ................ H04M 1/72561 715/736 |
| 2011/0285658 | A1 | 11/2011 | Homma et al. |
| 2012/0081267 | A1 | 4/2012 | Sirpal et al. |
| 2012/0214552 | A1* | 8/2012 | Sirpal ................ G06F 1/1616 455/566 |
| 2012/0231884 | A1* | 9/2012 | Sakai ................ G06F 1/1626 463/31 |
| 2012/0276958 | A1* | 11/2012 | Inami ................ H04M 1/0237 455/566 |
| 2013/0007653 | A1* | 1/2013 | Stolyarov ............ G06F 1/1626 715/784 |

FOREIGN PATENT DOCUMENTS

| | | |
|---|---|---|
| CN | 101977255 | 2/2011 |
| CN | 102012783 | 4/2011 |
| JP | 2000-293280 | 10/2000 |
| JP | 2003-198685 | 7/2003 |
| JP | 2007-220109 | 8/2007 |
| JP | 2009-187290 | 8/2009 |
| JP | 2009-223426 | 10/2009 |
| JP | 2010-44533 | 2/2010 |
| JP | 2010-055599 | 3/2010 |
| JP | 2010-55599 | 3/2010 |
| JP | 2010-108071 | 5/2010 |
| JP | 2010-140417 | 6/2010 |
| JP | 2010-146506 | 7/2010 |
| JP | 2010-182046 | 8/2010 |
| JP | 2011-036424 | 2/2011 |
| JP | 2011-070609 | 4/2011 |
| JP | 2011-076233 | 4/2011 |
| JP | 2011-512056 | 4/2011 |
| JP | 2011-203808 | 10/2011 |
| JP | 2012-073721 | 4/2012 |
| WO | WO 2011018869 A1 * | 2/2011 ........... G06F 1/1626 |

OTHER PUBLICATIONS

Japanese Official Action—2014-522642—dated Dec. 20, 2016.
Chinese Office Action dated Sep. 26, 2016 in corresponding Chinese Patent Application No. 201380027381.6 with English translation of Chinese Office Action.
Japanese Official Action—2014-522642—dated Aug. 22, 2017.
Chinese Office Action dated Apr. 24, 2017 in corresponding Chinese Patent Application No. 201380027381.6 with English translation of Chinese Office Action.
Japanese Official Action—2014-522642—dated Apr. 4, 2017.

\* cited by examiner

FIG. 8 ated with the main information on a lower layer underlying the main information; a first input unit that detects an operation that is input into a front surface side of the first display unit; a second input unit that is located on a rear surface side of the first display unit, and detects an input operation; and a control unit that, when the second input unit detects the operation, processes the attachment information that is displayed on the first display unit in accordance with the operation detected by the second input unit.

TERMINAL DEVICE, DISPLAY CONTROL METHOD, AND PROGRAM

TECHNICAL FIELD

The present invention relates to a terminal device, a display control method, and a program.

BACKGROUND ART

For example, as touch panels that are provided on two surfaces of a monitor, a touch panel-equipped information terminal device exists that is provided with: a first touch panel that is superimposed on a monitor and is used to select objects on a monitor screen that are to be operated; and a second touch panel that is provided on a rear side of the monitor and is used to move, enlarge, or reduce the selected objects. This touch panel-equipped information terminal device integrates the operations of the first and second touch panels and displays them on a single monitor screen (see, for example, Patent document 1).

Moreover, an information display device also exists that is provided with a pair of touch panels that are each placed on a different surface of a main body of the device, and that controls displays in accordance with a combination of inputs that are made into the pair of touch panels (see, for example, Patent document 2).

Furthermore, a terminal device also exists that, in order to optimize the user interface to correspond to the manner in which it is being held, detects the manner in which the terminal device is being held using two operating units that are provided on top of a display unit and on the rear surface of the display unit, and alters the user interface or alters the association with the entire display surface of the operating unit on the rear surface in accordance with manner in which the terminal device is being held so that it is suitable for the left hand or the right hand that is holding it (see, for example, Patent document 3).

PRIOR ART DOCUMENTS

Patent Documents

Patent document 1: Japanese Unexamined Patent Application, First Publication No. 2011-70609
Patent document 2: Japanese Unexamined Patent Application, First Publication No. 2009-223426
Patent document 3: Japanese Unexamined Patent Application, First Publication No. 2010-108071

SUMMARY OF INVENTION

Problems to be Solved by the Invention

However, because there are physical limits on the size of the display screen, the amount of information that can be displayed is limited. If a plurality of images are displayed overlaying one another on the display unit, then a greater amount of information can be displayed. When a user wishes to operate each one of the images that are displayed overlaying one another in this way, the problem arises that, the operability is poor because the user must shift to the operating screen for each image. Moreover, the devices are also inconvenient in that, in some cases, it is not obvious how to shift to the operating screen for each image.

The present invention was conceived in view of the above-described circumstances, and it is an exemplary object thereof to provide a terminal device, a display control method, and a program that are able to solve the above-described problems.

Means for Solving the Problems

In order to solve the above-described problems, the terminal device of the present invention includes: a first display unit that displays main information on an upper layer, and displays attachment information that is associated with the main information on a lower layer underlying the main information; a first input unit that detects an operation that is input into a front surface side of the first display unit; a second input unit that is located on a rear surface side of the first display unit, and detects an input operation; and a control unit that, when the second input unit detects the operation, processes the attachment information that is displayed on the first display unit in accordance with the operation detected by the second input unit.

Moreover, a display control method of the present invention includes: displaying main information on an upper layer of a display screen of a first display unit, and displaying attachment information that is associated with the main information on a lower layer underlying the main information; and when a second input unit that is located on a rear surface side relative to the display screen of the first display unit detects an input operation, processing the attachment information that is displayed on the first display unit in accordance with the operation detected by the second input unit.

Moreover, a program of the present invention is a program that causes a computer to function as: a first display unit that displays main information on an upper layer, and displays attachment information that is associated with the main information on a lower layer underlying the main information; a first input unit that detects an operation that is input into a front surface side of the first display unit; a second input unit that is located on a rear surface side of the first display unit, and detects an input operation; and a control unit that, when the second input unit detects the operation, processes the attachment information that is displayed on the first display unit in accordance with the operation detected by the second input unit.

Exemplary Advantages of the Invention

The present invention improves the operability when each one of images that are displayed overlaying one another on a single display screen is operated, and makes it possible for an operation to be performed easily and intuitively.

MODES FOR CARRYING OUT THE INVENTION

Figure 1A:
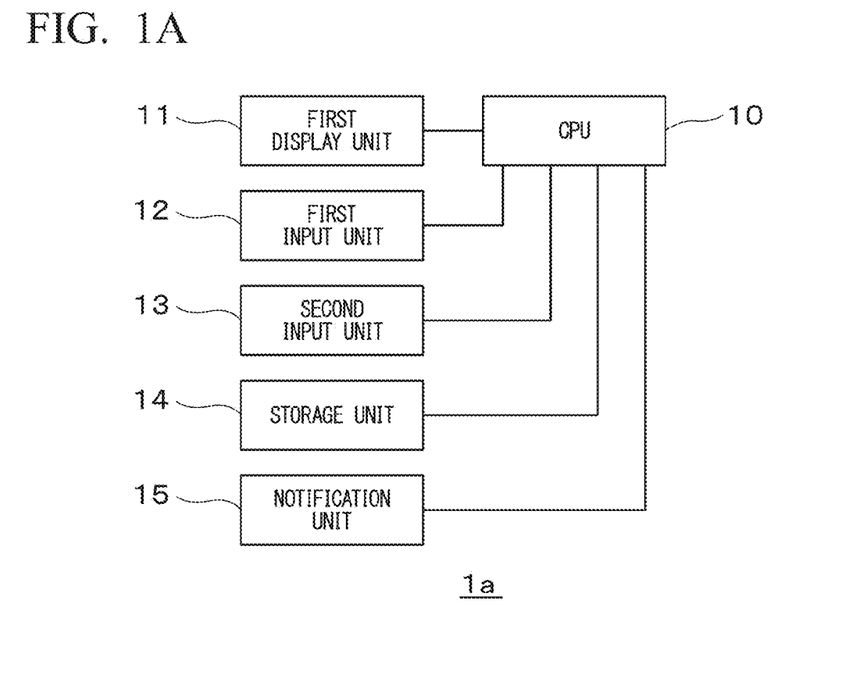
FIG. 1A is a block diagram showing an exemplary embodiment of a terminal device according to the present invention.
Figure 1B:
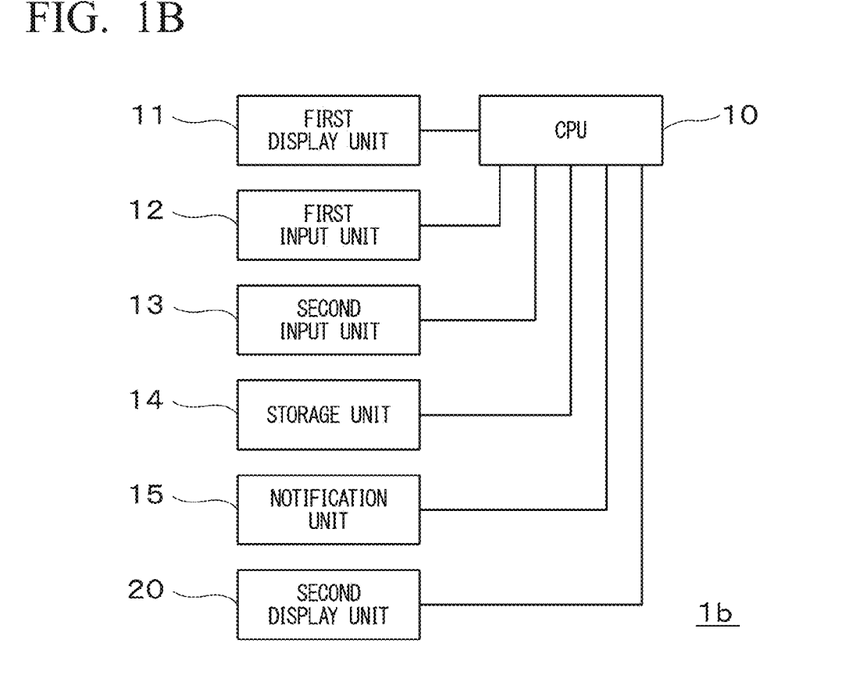
FIG. 1B is a block diagram showing an exemplary embodiment of a terminal device according to the present invention.

Hereinafter, an exemplary embodiment of a terminal device according to the present invention will be described with reference made to the drawings. FIGS. 1A and 1B are block diagrams in which two examples of the circuit structure of a terminal device serving as an exemplary embodiment of the present invention are shown as a terminal device 1a (FIG. 1A) and a terminal device 1b (FIG. 1B). The terminal device 1a of the present exemplary embodiment which is shown in FIG. 1A is provided with a CPU (central processing unit) 10, a first display unit 11, a first input unit 12, a second input unit 13, a storage unit 14, and a notification unit 15. The terminal device 1b of the present exemplary embodiment which is shown in FIG. 1B is provided with the structure provided in the terminal device 1a with the addition of a second display unit 20. The terminal device 1a and the terminal device 1b can be used to form a part of a mobile telephone terminal, a smartphone, a tablet device, an electronic organizer, an electronic dictionary, a personal computer, and other electronic devices. Note that FIGS. 1A and 1B show structure pertaining to the features of the present invention in the terminal device 1a and the terminal device 1b. Accordingly, the terminal devices 1a and 1b can also be provided with structure such as a camera, a communication unit, an audio input/output unit, and the like in addition to the structures shown in FIGS. 1A and 1B.

The CPU 10 is connected via a bus to the units within the device, and controls the units, namely, the first display unit 11, the second display unit 20 (this applies only to the terminal device 1b: the same is true in the rest of this Description), the first input unit 12, the second input unit 13, and the like. This CPU 10 operates by executing programs that are stored in the storage unit 14. In the present exemplary embodiment, the terminal devices 1a and 1b have a function of managing an address book, and a function of managing an appointment book. The address hook management function and appointment book management function are functions that are fulfilled as a result of the CPU 10 executing predetermined programs. Here, the address hook management function is a function in which data showing one or a plurality of contacts is stored in such a way that it can be registered, edited, and deleted. Data showing contacts is created such that it contains character data showing the name and title of a contact, their telephone number and email address, and the like. Furthermore, the data that shows the contacts can also contain one or a plurality of items of "data that shows image data" which are associated with the character data. Here, image data refers, for example, to image data that is contained in an image file photographed using a camera built into each of the terminal devices 1a and 1b, and to image data that is contained in an image file acquired from an external source via, for example, predetermined communication. Moreover, the "data that shows image data" which is included in data showing contacts is in the form of character data that shows the file name of an image file that contains the image data, and also shows the storage address of the image file.

In this way, main information and attachment information that is associated with the main information is stored in the storage unit 14. In the present exemplary embodiment, the main information is character data, while the attachment information is image data that is associated with this character data.

Moreover, the appointment book management function is a function in which data showing one or a plurality of appointments is stored in such a way that it is associated with a date and a time and it can be registered, edited, and deleted. Data showing appointments is created such that it contains character data showing the date, the day of the week, the time, and the appointment contents. Furthermore, the data showing the appointments can also contain one or a plurality of items of the "data that shows image data" which are associated with the character data. Here, image data refers, for example, to image data that is contained in an image file photographed using a camera built into the terminal device 1, and to image data that is contained in an image file acquired from an external source via, for example, predetermined communication. Moreover, the "data that shows image data" which is included in data showing appointments is character data that shows the file name of an image file that contains the image data, and also shows the storage address of the image file.

The first display unit 11 and the second display unit 20 are display devices such as liquid crystal displays, organic EL (electroluminescent) displays, or the like. The first display unit 11 and the second display unit 20 display images in accordance with predetermined control signals that are received from the CPU 10. Note that the first display unit 11 and the second display unit 20 are able to independently display mutually different images. The first display unit 11 and the second display unit 20 can handle binary black-and-white displays, multi-gradation (grayscale) displays, and color displays.

The first input unit 12 detects operations that are input into a display screen that is on the front surface side of the first display unit 11. This first input unit 12 is formed by a contact sensor such as a touch sensor, and detects the position where it is contacted by a user's finger or the like. Namely, the first input unit 12 detects a predetermined input operation which utilizes contact from a user's finger or the like, and outputs the detection result to the CPU 10. In accordance with the detection result from the first input unit 12, the CPU 10 recognizes input operations that utilize contact by a user's finger such as a touch (an input operation in which the display screen is lightly touched by a finger or the like), a drag (an input operation in which a finger slides gently across a display screen while staying in contact with the display screen), and a flick (an input operation in which a finger brushes rapidly across a display screen while staying in contact with the display screen).

The second input unit 13 detects operations that are input into a display screen of the second display unit 20 that is located on the rear surface side of the first display unit 11. This second input unit 13 is formed by a contact sensor such as a touch sensor, and detects the position where it is contacted by a user's finger or the like. The second input unit 13 is placed apart from the first input unit 12. In the same way as the first input unit 12, the second input unit 13 detects a predetermined input operation which utilizes contact from a user's finger or the like, and outputs the detection result to the CPU 10. In accordance with the detection result from the second input unit 13, the CPU 10 recognizes input operations such as a touch, a drag, and a flick that utilize contact by a user's finger.

The storage unit 14 is formed having non-volatile and volatile storage devices, and stores programs that are executed by the CPU 10, and data that is temporarily required when the CPU 10 executes the programs. Moreover, the storage unit 14 stores a plurality of items of character data, or of image data that is to be associated with the character data that are managed by the address book management function and the appointment book management function.

The notification unit 15 is formed by an audio control unit and speakers that are controlled by the CPU 10, and emits audio signals from the speakers via the audio control unit. The notification unit 15 is used when daily alarms, operating sounds, and the like are emitted.

Next, an example of the layout of the first display unit 11, the second display unit 20, the first input unit 12, and the second input unit 13 in the terminal device 1a and the terminal device 1b that are shown in FIGS. 1A and 1B will be described with reference made to FIGS. 2A and 2B and to FIGS. 3A through 3C. Note that in the examples shown in FIGS. 2A and 2B and in FIGS. 3A through 3C, the terminal device 1a is formed by a single case 16a, while the terminal device 1b is formed by two cases 16b and 16c.

Figure 2A:
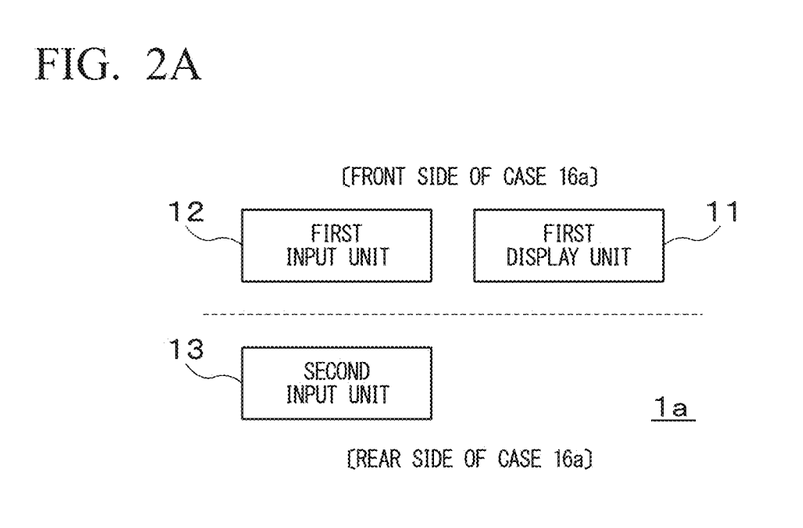
FIG. 2A is an explanatory view illustrating an example of the layout of a first display unit, a first input unit, and a second input unit that are shown in FIG. 1A.

FIG. 2A shows an example of the layout of the units in the terminal device 1a shown in FIG. 1A. Moreover, FIG. 2B shows an example of the layout of the units in the terminal device 1b shown in FIG. 1B. In the layout example of the terminal device 1a shown in FIG. 2A, the first display unit 11 is placed on the front side of the case 16a of the terminal device 1a. Moreover, the first input unit 12 is constructed as a touch sensor that is formed on the front surface of the first display unit 11. Moreover, the second input unit 13 is placed on the rear side of the case 16a, and is constructed as a touch sensor that is formed on the rear surface of the case 16a.

Figure 2B:
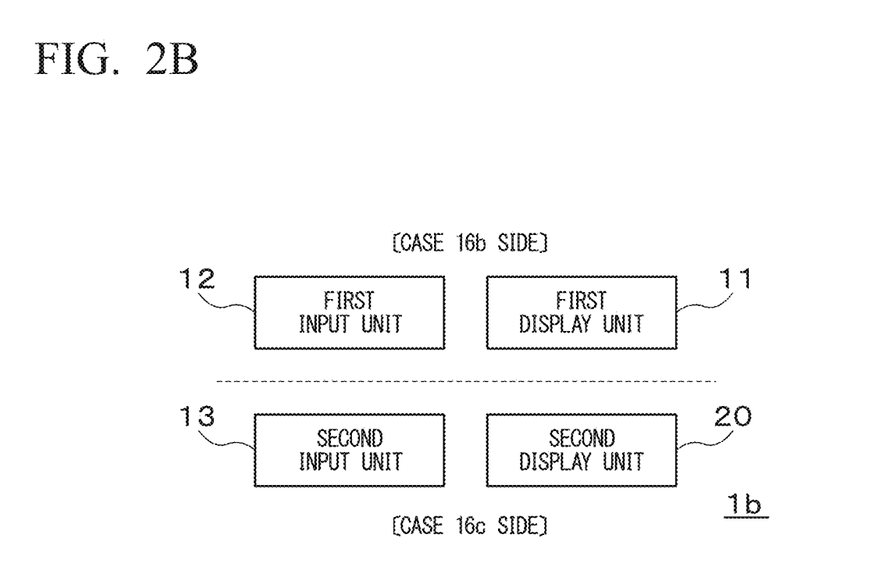
FIG. 2B is an explanatory view illustrating an example of the layout of a first display unit, a second display unit, a first input unit, and a second input unit that are shown in FIG. 1B.

In contrast, in the layout example of the terminal device 1b shown in FIG. 2B, the first display unit 11 is placed on one surface of the case 16b of the terminal device 1b. Moreover, the first input unit 12 is constructed as a touch sensor that is formed on the front surface of the first display unit 11. Moreover, the second display unit 20 is placed on one surface of the other case 16c of the terminal device 1b. Moreover, the second input unit 13 is constructed as a touch sensor that is formed on the front surface of the second display unit 20.

Figure 3A:
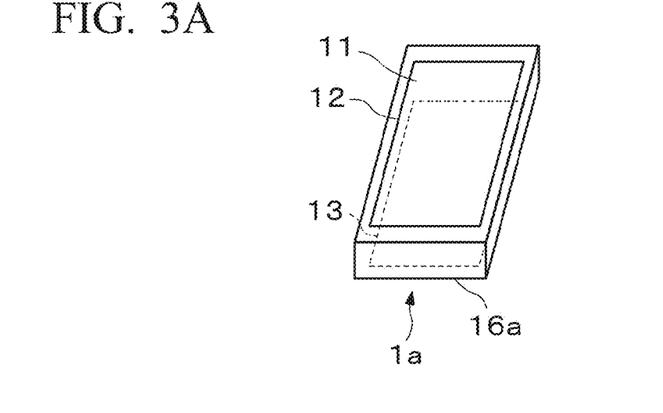
FIG. 3A is a perspective view showing an example of the exterior structure of the terminal device shown in FIG. 1A.

FIG. 3A shows an example of the exterior structure of the terminal device 1a shown in FIG. 1A and FIG. 2A. Moreover, FIGS. 3B and 3C show an example of the exterior structure of the terminal device 1b shown in FIG. 1B and FIG. 2B. Here, FIG. 3B shows a state in which the case 16b and the case 16c are closed, while FIG. 3C shows a state in which the case 16b and the case 16c are open.

As is shown in FIG. 3A, in the terminal device 1a, the first display unit 11 and the first input unit 12 are placed on the front side of the case 16a, and the second input unit 13 is placed on the rear side of the case 16a. In this case, the first input unit 12 and the second input unit 13 are, for example, mutually opposite each other, and use either the same, or substantially the same range as their detection range. In the structure shown in FIG. 3A, a user, for example, holds the terminal device 1a in one hand, and is able to perform input operations either simultaneously or consecutively into the first input unit 12 and the second input unit 13 using mutually different fingers of the same hand that is holding the terminal device 1a.

Figure 3B:
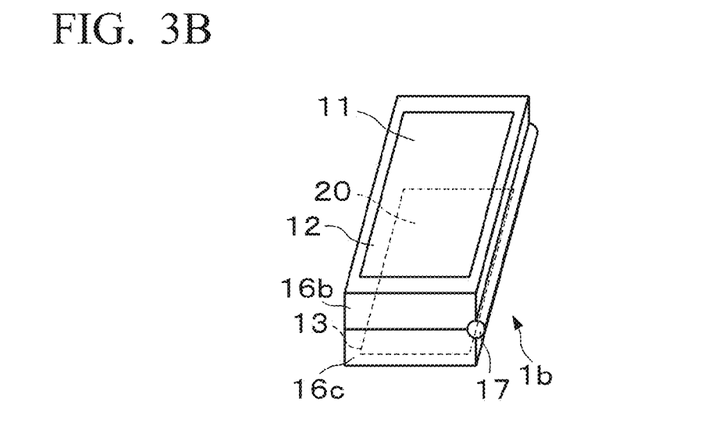
FIG. 3B is a perspective view showing an example of the exterior structure of the terminal device shown in FIG. 1B.
Figure 3C:
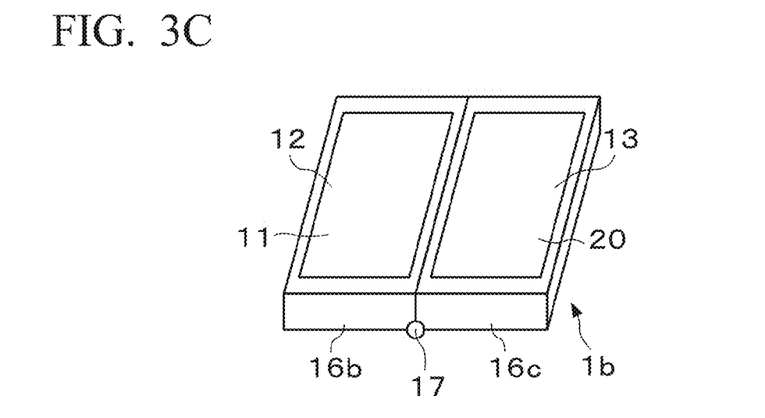
FIG. 3C is a perspective view showing an example of the exterior structure of the terminal device shown in FIG. 1B.

In contrast, as is shown in FIGS. 3B and 3C, in the terminal device 1b, the first display unit 11 and the first input unit 12 are placed on one surface of the case 16b, while the second display unit 20 and the second input unit 13 are placed on one surface of the case 16c. The first input unit 12 and first display unit 11 use either the same, or substantially the same sized ranges as their detection range and display range as do the second input unit 13 and second display unit 20. Moreover, the case 16b and the case 16c are joined together via a hinge 17 so that they are able to be closed (i.e., the state shown in FIG. 3B) or opened (i.e., the state shown in FIG. 3C). Namely, the terminal device 1b has a bi-fold structure, and when closed, the surface on the front side and the surface on the rear side of the terminal device 1b form the display unit and the input unit. When open, the two screens are horizontally adjacent (or vertically adjacent) so as to form a large-sized screen.

In the state shown in FIG. 3B, a user, for example, holds the terminal device 1b in one hand, and is able to perform input operations either simultaneously or consecutively into the first input unit 12 and the second input unit 13 using mutually different fingers of the same hand that is holding the terminal device 1b. Moreover, in the state shown in FIG. 3C, a user, for example, holds the terminal device 1b in both hands, and is able to perform input operations either simultaneously or consecutively into the first input unit 12 using the fingers of one hand that is holding the terminal device 1b, and into the second input unit 13 using the fingers of the other hand that is holding the terminal device 1b.

In this manner, the terminal device 1b has a structure that enables it to transform from the state shown in FIG. 3B to the state shown in FIG. 3C. In other words, the terminal device 1b is able to transform into a state in which the second display unit 20 and the second input unit 13 are positioned alongside the first input unit 12 on the front surface side of the first display unit 11.

When the second display unit 20 is placed on the rear surface side of the first display unit 11, namely, when it is in a state such as that shown in FIG. 3B, the CPU 10 causes main information and attachment information to be displayed on the first display unit 11.

When the first display unit 11 and the second display unit 20 are placed alongside each other, namely, when they are in a state such as that shown in FIG. 3C, the CPU 10 causes main information to be displayed on the first display unit 11, and causes attachment information to be displayed on the second display unit 20.

Figure 4:
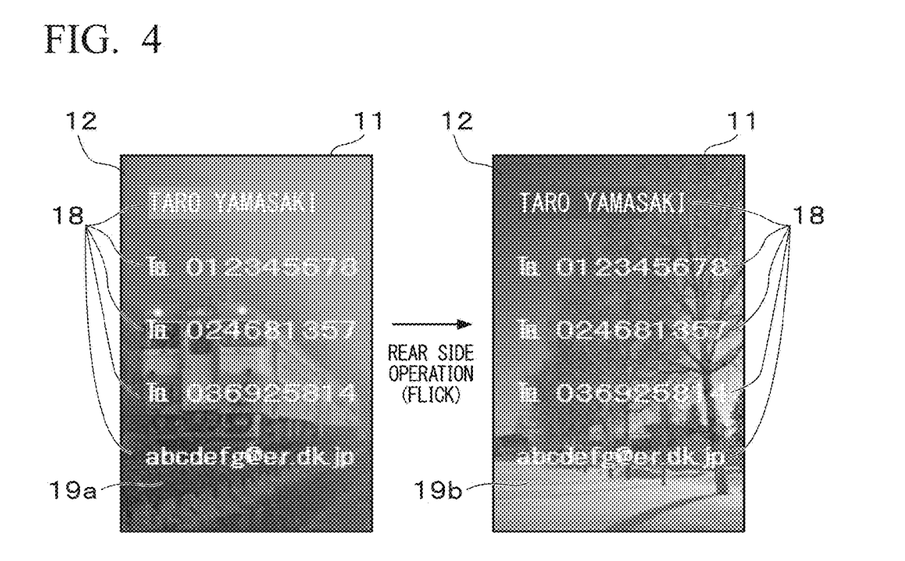
FIG. 4 is a view showing an example of an image display on the first display unit shown in FIGS. 1A and 1B.

Next, an example of an operation of the terminal devices 1a and 1b shown in FIGS. 1A and 1B will be described with reference made to FIG. 4 and FIG. 5. FIG. 4 shows a change in a display image on the first display unit 11 shown in FIG. 2A and FIG. 3A, or in FIG. 2B and FIG. 3B.

In the example shown in FIG. 4, a first image 18 which shows character data (i.e., main information) that is contained in data showing one contact that is managed by the address book management function is displayed on the first display unit 11. Furthermore, a second image 19a or 19b which shows image data (i.e., attachment information) that is either associated with the character data shown by the first image 18, or is a candidate for association is displayed overlaid with the first image 18 on the first display unit 11. In this case, the displays of the first image 18 and the second image 19a or 19b are overlaid in a two-layer structure in which the first image 18 is on the upper layer and the second image 19a or 19b is on the lower layer.

Moreover, FIG. 4 also shows two examples of displays on the first display unit 11, namely, before and after a predetermined input operation is performed in order to switch the image data (in the present exemplary embodiment, this is called a flick operation that is performed on the second input unit 13 on the rear side). The display image before the predetermined input operation is performed is the display example on the left side of the arrow shown in the center, and the display image after the input operation is performed is the display example on the right side of the arrow. In the display image before the predetermined input operation is performed, the displays of the first image 18 and the second image 19a overlay each other. In addition, in the display image after the predetermined input operation is performed, the displays of the first image 18 and the second image 19b overlay each other. Namely, FIG. 4 shows that when a predetermined input operation is performed in order to switch the image data in a state in which the first image 18 and the second image 19a are displayed overlaying each other, the state is switched to a state in which the second image 19a is altered to the second image 19b, and the first image 18 and the second image 19b are displayed overlaying each other.

Next, the flow of the processing to switch the image data shown in FIG. 4 will be described with reference made to FIG. 5. FIG. 5 is a flowchart showing the processing flow of a portion of program that form the address book management function and the appointment book management function that are executed by the CPU 10. Note that here the address book management function is described as an example. In this case, the flowchart shown in FIG. 5 shows the flow of a program (for example, a single module and subroutine) that is executed when the program that forms the address book management function has been called in response to a predetermined operation performed by a user.

Figure 5:
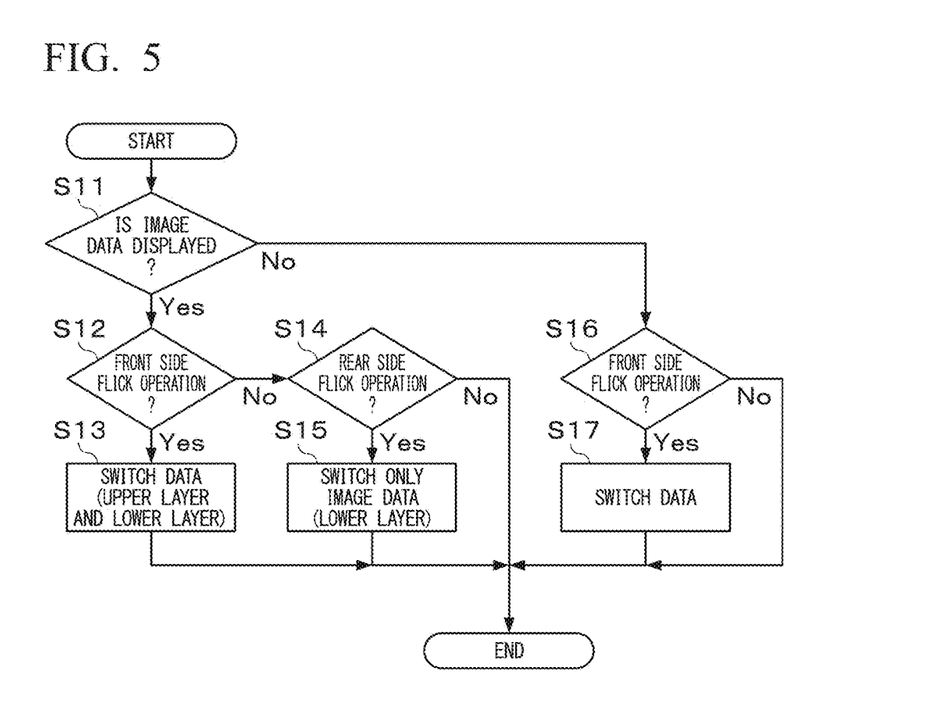
FIG. 5 is a flowchart showing an example of a processing flow in the terminal device shown in FIGS. 1A and 1B.

Furthermore, the flowchart shown in FIG. 5 also shows the processing when an input operation is performed by a user into the first input unit 12 or the second input unit 13 (namely, when an input event has occurred) while data showing a single contact is being displayed. This displaying of the data showing a single contact may be performed during processing to display the contact data (hereinafter, this is referred to as "display mode"), or it may be performed during processing to newly register or alter image data that is to be associated with the character data that is contained in the contact data (hereinafter, this is referred to as "editing mode").

Firstly, the CPU 10 determines whether or not the current display state that was instructed by the processing (for example, the main routine of the address book management program) that called the processing shown in FIG. 5 is displaying a second image (which corresponds to the second images 19a and 19b in FIG. 4) that corresponds to the image data (step S11). Namely, the CPU 10 determines whether or not the current display state is one in which a plurality of images are displayed overlaying each other on the first display unit 11 (in other words, whether or not the image being displayed on the first display unit 11 is data for a two-layer structure).

If the current display state is displaying the second image that corresponds to the image data, then the result of the determination in step S11 is YES. In contrast, if the current display state is not displaying the second image that corresponds to the image data, then the result of the determination in step S11 is NO.

If the current display state is displaying the second image that corresponds to the image data (i.e., if the determination in step S11 is YES), the CPU 10 determines whether or not the input operation by the user is a flick operation on the front side, namely, whether or not the operation was performed on the first input unit 12 (step S12). A front side flick operation is an operation pertaining to the main information and is a flick operation performed on the first input unit 12.

If the input operation by the user is a front side flick operation (i.e., if the determination in step S12 is YES), the CPU 10 switches the main information, in other words, switches the contact data (step S13). Namely, in step S13, the CPU 10 calls the next contact data that has been registered in the address book from the storage unit 14, and displays a first image that shows character data contained in the called contact data. In conjunction with this, the CPU 10 displays on the first display unit 11 such that the first image is overlaid with a second image that shows image data that has been associated with this character data and stored. Namely, when the first input unit 12 detects that a screen switching operation has been performed, the CPU 10 switches the main information and the attachment information currently being displayed on the first display unit 11 to other main information and attachment information that is associated with the other main information.

However, if there is no next contact data registered in the address book, the CPU 10 does not switch the display image. Here, next contact data is data for another contact in the address book, and is the subsequent contact data in a predetermined sequence among a plurality of contact data items.

Note that if image data has not been associated with the character data contained in the next contact data that is called in step S13, the CPU 10 displays image data that serves as a candidate for association, a predetermined background image, or the like, as the second image. Here, image data serving as a candidate for association is, for example, the data for a single image that is included in a plurality of image files that are stored in a predetermined folder or the like that is specified by a user within the storage unit 14.

In this way, in the processing of step S13, if there is next contact data, and if image data has been associated with the character data contained in this next contact data, then the CPU 10 simultaneously switches the first image 18 which shows the upper layer character data and the second image 19a or 19b which shows the lower layer image data.

If on the other hand, the determination in step S12 is NO, namely, if the input operation by the user is not a flick operation on the front side, the CPU 10 determines whether or not the input operation by the user is a flick operation on the rear side, in other words, whether or not the operation is performed on the second input unit 13 (step S14). A rear side flick operation is an operation pertaining to the attachment information and is a flick operation performed on the second input unit 13. If the input operation by the user is a rear side flick operation (i.e., if the determination in step S14 is YES), the CPU 10 switches the attachment information, in other words, switches the image data (step S15). The processing of step S15 differs between when it is performed in display mode and when it is performed in editing mode in the following manner.

Namely, in display mode, in step S15 the CPU 10 calls from the storage unit 14 the next image data that is associated with the character data currently being displayed as the first image 18. The CPU 10 then displays the first image 18 which is currently being displayed, and the second image (in FIG. 4 this is the second image 19b) which shows the newly called image data such that they overlay each other on the first display unit 11. However, if no next image data that is associated with the character data currently being displayed has been registered in the address book, the CPU 10 does not switch the display image. When a plurality of image data items are associated with the single character data item currently being displayed, the next image data refers to the subsequent image data in a predetermined sequence among that plurality of image data items.

In contrast, in editing mode, in step S15, the CPU 10 calls from the storage unit 14 the next image data that is a target for being associated with the character data currently being displayed as the first image 18. The CPU 10 then displays the first image 18 which is currently being displayed, and the second image (in FIG. 4 this is the second image 19b) which shows the newly called image data such that they overlay each other on the first display unit 11. Here, the image data serving as a candidate for association can, for example, be the data for a single image that is included in a plurality of image files that are stored in a predetermined folder or the like that is specified by a user within the storage unit 14. However, if there is no undisplayed image data that is a target for association with the character data currently being displayed remaining in the storage unit 14, the CPU 10 does not switch the display image.

If, on the other hand, the determination in step S11 is NO, the CPU 10 determines whether or not the input operation by the user is a flick operation on the front side (step S16). If the input operation by the user is a front side flick operation (i.e., if the determination in step S16 is YES), the CPU 10 switches the main information, namely, switches the contact data (step S17). Namely, in step S17, the CPU 10 calls from the storage unit 14 the next contact data that is registered in the address book, and displays on the first display unit 11 the first image which shows the character data contained in the called contact data. In this case, a plain background image, a predetermined background image, or the like can be displayed as the second image.

If, on the other hand, the determination in step S16 is NO, namely, if the input operation by the user is not a front side flick operation, the CPU 10 does not switch the display image. In this case, the display image on the first display unit 11 is not altered.

Note that in the foregoing description, the processing that is performed when character data that is stored in the address book management function and image data that has been associated therewith or that is to be associated therewith are switched is described. However, in the appointment book management function as well, in accordance with the flowchart shown in FIG. 5, the CPU 10 is able in the same way to switch character data contained in the appointment data and image data that has been associated with or that is to be associated with that character data. Moreover, input operations into the first input unit 12 or the second input unit 13 are not limited to the above-described flick operation. For example, they may also be in the form of a touch operation or a drag operation.

Furthermore, in the foregoing description, operations of a terminal device were described using as a subject the terminal device 1a that is provided with a single one of the display unit that was described with reference made to FIG. 2A and FIG. 3A. In contrast to this, in the terminal device 1b that is provided with two of the display unit that was described with reference made to FIG. 2B, FIG. 3B, and FIG. 3C, the switching processing of the character data and the image data can be performed in the following manner.

Namely, in the terminal device 1b, as is shown in FIG. 3B, when this terminal device 1b is used with the case 16b and the case 16c in a closed state, the image data items can be displayed in the same way as in the terminal device 1a. Namely, the first image 18 which shows character data, and the second image 19a or 19b which shows image data that has been associated with the first image 18 or that is to be associated with the first image 18 are displayed overlaying each other on the single first display unit 11. Moreover, the ways in which input operations are made into the first input unit 12 and the second input unit 13 can be made the same as in the terminal device 1a.

In contrast, as is shown in FIG. 3C, when the terminal device 1b is used with the case 16b and the case 16c in an open state, the first image which shows character data is displayed on the first display unit 11, and the second image which shows the image data that has been associated with or that is to be associated with the first image is displayed on the second display unit 20. Namely, the image showing the character data and the image showing the image data are not displayed overlaying each other, but instead the images showing the data items are displayed on mutually different display units (i.e., display screens). However, the switching of the character data in response to an input operation into the first input unit 12 and the switching of the image data in response to an input operation into the second input unit 13 are the same as when the two images are displayed overlaying each other.

In the terminal device 1b having a bi-fold structure, when the terminal device 1b is closed, in the same way as the terminal device 1a, the two surfaces (i.e., the front surface and the rear surface) serve as touch sensors, and when the terminal device 1b is open the two display screens create a large side-by-side screen. In the terminal device 1b, the screens that display data such as the address book and the appointment book are displayed overlaying each other when closed. In contrast, when open, the image showing character data can be displayed on the left side, while the image showing the image data that is associated therewith or is to be associated therewith can be displayed on the right side. By doing this, an overlapping display that is difficult to properly discern can be displayed such that it is the same size but is easy to view. Moreover, it is also possible to automatically transit to an image switching editing state (i.e., editing mode) when the state is changed from an open state to a closed state. Namely, it is also possible to employ a structure in which, if the terminal device 1b is changed to the closed state from the open state in which it was displaying character data (and image data), then it is automatically converted to the mode for associating image data. Moreover, in order to prevent a user from performing an operation that the user did not intend to as a result of accidentally touching the rear surface with a user's finger, it is also possible to move the editing buttons and the like to the display on the front side. Namely, if a detection result from the first input unit 12 corresponds to a predetermined input operation, the CPU 10 is also able to alter the image data shown by the second image in accordance with the detection result from the second input unit 13.

As has been described above, in the present exemplary embodiment, when a second image which shows image data is displayed together with a first image which shows character data in a display screen for data that is managed as an address book or appointment book or the like, it is possible to switch only data (i.e., image data) for the lower layer (or the right side) via an operation (i.e., a flick, a touch, or the like) performed on the rear side (or on the right side). Accordingly, it becomes possible to switch the lower layer image via an intuitive and simple operation. Furthermore, in the present exemplary embodiment, it is possible to simultaneously switch the data (i.e., character data) on the upper layer (or the left side) and the data (i.e., image data) on the lower layer (or the right side) via a front side operation (i.e., a flick, a touch, or the like). As a result of this, the switching of the entire data, namely, the character data and the image data can be performed via a front side operation (or a left side operation), while the switching of only the lower layer (i.e., the right side data (image data)) can be performed via a rear side operation (or a right side operation), and the switching of the character data and the selection of the image data that is associated therewith or that is to be associated therewith can be performed substantially in parallel and simultaneously. Accordingly, if, for example, a user wishes to edit an image data association in editing mode or the like, the operation to edit image data associations consecutively for a plurality of character data items becomes easy.

Note that as is shown in FIG. 3C, when the terminal device 1b is open, the two display screens, namely, the first display unit 11 and the second display unit 20 can not only be aligned horizontally when they are used, but the first display unit 11 and the second display unit 20 can also be aligned vertically and used in this state. In this case, the state of the terminal device 1b can be detected either manually or automatically using sensors that detect attitude, and the orientation of the display altered accordingly.

Next, a description will be given with reference made to FIG. 6 of an example of the processing structure in the switching processing (S15) for only the image data which is shown in FIG. 5. In this processing shown in FIG. 6, the image data that is to be switched during the image data switching is narrowed down, so that the image data switching can be performed even more simply. Here, the address book management function is used as a subject in the description.

The CPU 10 firstly determines whether or not the next image data that has been associated with or is to be associated with the character data currently being displayed is present (step S21). If the next image data that has been associated therewith is not present (i.e., if the determination in step S21 is NO), the CPU 10 ends the processing without taking any further action.

If, on the other hand, the next image data is present (i.e., if the determination in step S21 is YES), the CPU 10 performs face recognition processing on the next image data (step S22). Next, the CPU 10 determines whether or not as a result of the face recognition processing a facial image has been recognized in the next image data (step S23). If a facial image is present in the next image data (i.e., if the determination in step S23 is YES), the CPU 10 switches the image data shown by the second image (namely, the lower layer image or the right side image) to the next image data (step S24). Then the CPU 10 ends the processing.

If, on the other hand, a facial image is not present in the next image data (i.e., if the determination in step S23 is NO), the processing returns to step S21 and a determination is made as to whether or not the next image data that is associated with the character data currently being displayed is registered in the address book.

Figure 6:
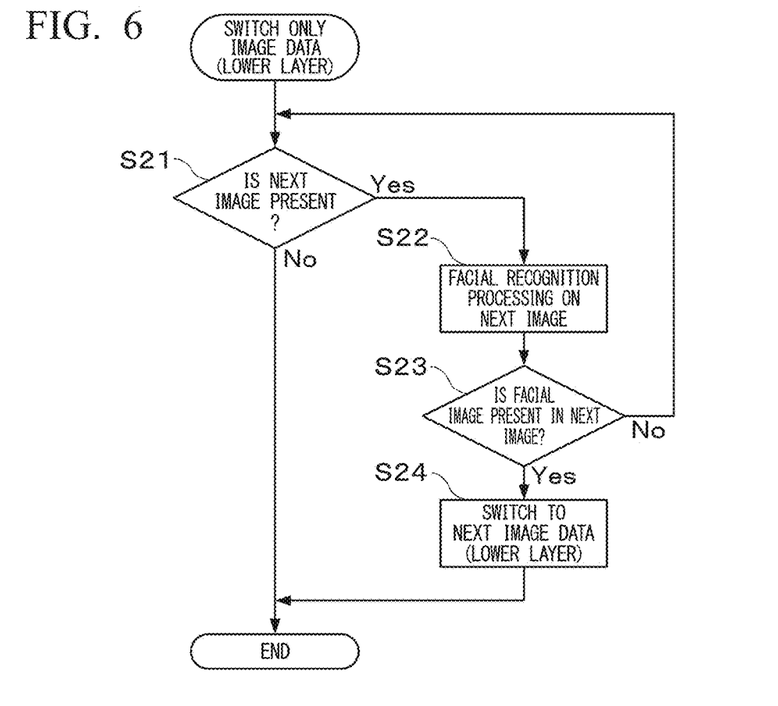
FIG. 6 is a flowchart showing an example of the structure of switching processing of only the image data shown in FIG. 5.

In the processing shown in FIG. 6, when the second input unit 13 has detected a screen switching operation, the CPU 10 is able to switch to attachment information that includes a person's face among the attachment information that is associated with the main information displayed on the first display unit 11. In this case, it is preferable for the main information to be information showing an individual person. As a result of this, the displayed image data can be narrowed down to images that include a facial image. Accordingly, when an address book is displayed, if the user wishes to confirm the face of the contact person, it is easy to select the facial image. Moreover, when an address book is being edited or a new contact is being registered, it is easy to single out the image to be associated with the contact's character data and registered.

Note that in the determination as to whether or not a facial image is present, it is also possible for the following settings to be made. Namely, it is also possible to determine whether or not the specific face designated by the user is present. Alternatively, it is also possible to determine whether or not an image showing just one person's face is present. Alternatively, it is also possible to determine whether or not the specific face of one particular person is present.

Moreover, in the processing included in the switching processing for only the image data (S15) which is described in FIG. 5, the data can be narrowed down in the following ways. Namely, a user can combine previously designated images into a group and register them, and then switch images with the switching choice limited to only images that belong to that group. In other words, when image data is switched via an operation (i.e., a flick, or a tap) performed on the second input unit 13, then the user can group together the image data in advance, and then limit the selection to only image data that belongs to the designated group.

In other words, if group information showing a group to which attachment information belongs is given to the attachment information, then when the second input unit 13 detects a screen switching operation, in accordance with the designated group, the CPU 10 is able to switch to attachment information belonging to that group among the attachment information that is associated with the main information displayed on the first display unit 11. Note that the designation of a group may be set in advance, or else designations made by a user may be used.

Figure 7:
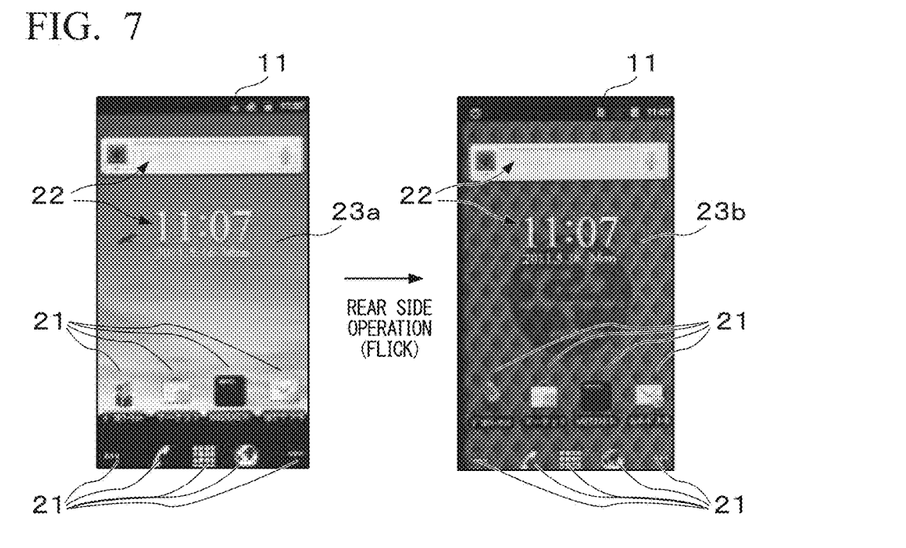
FIG. 7 is a view showing an example of an image display on the first display unit shown in FIGS. 1A and 1B.

Note also that the above-described user interface is not limited to data made up of character data and image data, as is the case with the address book management function and the appointment book management function, and a screen in which a display screen such as the home screen forms a two-layer structure can also be used. Namely, as is shown in FIG. 7, in the home screen, images are displayed on the first display unit 11 in a two-layer structure in which icons 21, widgets 22, and the like are arranged on the upper layer screen, while the lower layer screen shows a wallpaper 23a. In this case, the lower layer screen can be switched by performing a rear surface operation. Namely, for example, the wallpaper 23a can be switched to a wallpaper 23b by performing a flick operation on the rear surface. In the case of the home screen, for example, a user may wish to change the wallpaper to match their mood on any particular day, and it is possible to switch the wallpaper on the lower layer screen alone both "easily" and "intuitively" via a rear screen operation.

In other words, the CPU 10 displays indexes (i.e., the icons 21, widgets 22, and the like) instructing that a particular program be executed as the main information, and also displays a wallpaper image as the attachment information.

Moreover, if the data (i.e., image data) that is displayed on the lower layer screen is larger than the screen size of the terminal device 1a or 1b, then not only is it possible to switch the lower layer screen via a rear screen operation, but moving the lower layer screen in synchronization with the movement of the user's finger is also possible. Moreover, if the data (i.e., image data) that is displayed on the lower layer screen is smaller than or is the same size as the screen size of the terminal device 1, then it is possible to enlarge or reduce the data (i.e., the image data) by performing a pinch-out, and moving it in synchronization with the movement of the user's finger is also possible.

In other words, when the second input unit 13 detects an operation to move the display area of the image data displayed on the first display unit 11, or detects an operation to reduce or enlarge the image data being displayed, the CPU 10 is able to move the display area, or reduce or enlarge the display image for only the image data attachment information) that is displayed on the first display unit 11.

Moreover, in the above-described exemplary embodiment, the lower layer screen is switched by performing a rear surface operation; however, there may also be cases in which a user performs an incorrect operation as a result of a user's finger making contact accidentally with the rear surface. In order to avoid such incorrect operations, a method can be employed in which it is only possible to switch screens when a rear surface operation (namely, an operation into the second input unit 13) is performed while the user's finger is in contact with the front surface (namely, with the first input unit 12).

In other words, if the second input unit 13 detects an operation at the same time as the first input unit 12 is detecting an operation, the CPU 10 is able to process the attachment information displayed on the first display unit 11 in accordance with the operation detected by the second input unit 13.

Moreover, in the above-described exemplary embodiment, when a plurality of image data items are associated with a single character data item is present, or when a plurality of image data items that are candidates for being associated with a single character data item are present, then one character data item and one image data item are displayed; however, it is also possible for a plurality of image data items to be displayed. Namely, a single character data item and a single image data item among a plurality of image data items that have been associated with or are to be associated with that character data item are overlaid with each other, as in the above-described exemplary embodiment, or they are divided between a plurality of display units (i.e., display screens) and displayed, and the image data item either preceding or succeeding that image data item can be displayed simultaneously therewith. In this case, the image data item either preceding or succeeding that image data item can be displayed, for example, at a reduced size or, if overlaid, then having a modified brightness or transparency.

Figure 8:
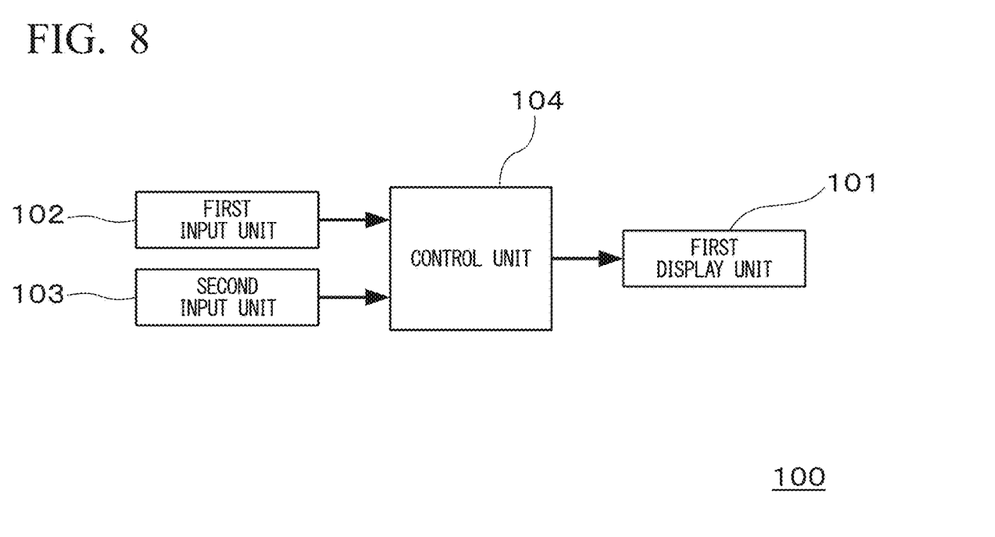
FIG. 8 is a block diagram showing the basic structure of an exemplary embodiment of a terminal device according to the present invention.

Note that the basic structure of an exemplary embodiment of the present invention can be depicted in the manner shown in FIG. 8. Namely, a terminal device 100 which serves as an exemplary embodiment of the present invention is provided with a first display unit 101, a first input unit 102, a second input unit 103, and a control unit 104.

The first display unit 101 (corresponding, for example, to the first display unit 11 of the exemplary embodiment) displays main information on the upper layer, and displays attachment information that is associated with the main information on the lower layer overlaid with the main information.

The first input unit 102 (corresponding, for example, to the first input unit 12 of the exemplary embodiment) detects operations input into the front surface side of the first display unit 101.

The second input unit 103 (corresponding, for example, to the second input unit 13 of the exemplary embodiment) is located on the rear surface side of the first display unit 101, and detects operations input therein.

The control unit 104 (corresponding, for example, to the CPU 10 of the exemplary embodiment) performs processing on attachment information that is displayed on the first input unit 101 in accordance with an operation detected by the second input unit 103 when the second input unit 103 has detected the operation.

Moreover, exemplary embodiments of the present invention are not limited to those described above, and it is also possible for the respective blocks shown in FIG. 1A, FIG. 1B, FIG. 2A, and FIG. 2B to be modified by being divided, combined, or increased in number wherever this is appropriate. Moreover, a portion of or the entirety of the programs executed by the CPU 10 may also be distributed via a computer-readable recording medium or communication line.

Note that the terminal device 1 according to an exemplary embodiment of the present invention has an internal computer system. The operating steps are stored on a computer-readable recording medium in program form, and the above-described processing is enacted when this program is read and executed by the computer system. Here, "computer system" includes a CPU, various types of memory and OS (Operating System), as well as hardware such as peripheral devices and the like.

Moreover, if a WWW (World Wide Web) system is being used, "computer system" can also include home page providing environments (or display environments).

Moreover, it is also possible for a program that implements the respective steps to be recorded on a computer-readable recording medium, and for a program that fulfills this function to be recorded on a computer-readable recording medium, and for the above-described processing to be performed as a result of the program recorded on this recording medium being read to a computer system and executed.

Moreover, "computer-readable recording medium" refers to transportable media such as a flexible disk, a magneto-optical disk, ROM (Read Only Memory), recordable non-volatile memory such as flash memory, a CD (Compact Disc)-ROM, and storage devices such as hard disks that are built into a computer system.

Moreover, "computer-readable recording medium" also includes devices that hold a program for a fixed time such as the internal volatile memory (for example, DRAM (Dynamic Random Access Memory)) in a computer system which forms the server or client when the program is transmitted via a network such as the Internet or via a communication circuit such as a telephone circuit.

Moreover, this program may also be transmitted from a computer system that stores the program on a storage device or the like via a transmission medium. Alternatively, this program may be transmitted to another computer system by means of a transmission wave within the transmission medium. Here, the "transmission medium" that transmits the program refers to a medium having a function of transmitting information such as a network (i.e., a communication network) such as the Internet or a communication circuit (i.e., a communication line) such as a telephone circuit.

Moreover, the above-described program may also be designed to fulfill a portion of the above described functions. Furthermore, the above-described program may also achieve these functions in combination with a program which is already recorded on the computer system, that is, what is known as a differential file (a differential program).

While the present invention has been described and illustrated above with reference made to the exemplary embodiment, the present invention is not limited to the above-described exemplary embodiment. Various modifications can be made within the range of understanding of one skilled in the art to the structure and details of the present invention within the scope of the present invention.

This application is based upon and claims the benefit of priority from Japanese Patent Application No. 2012-1446661, filed on Jun. 29, 2012, the disclosure of which is incorporated herein in its entirety by reference.

INDUSTRIAL APPLICABILITY

The present invention can be applied to various types of terminal device. The present invention improves the operability when each one of images that are displayed overlaying one another on a single display screen is operated, and makes it possible for an operation to be performed easily and intuitively.

DESCRIPTION OF THE REFERENCE SIGNS 1a, 1b . . . Terminal device
10 . . . CPU
11 . . . First display unit
12 . . . First input unit
13 . . . Second input unit
14 . . . Storage unit
15 . . . Notification unit
18 . . . First image
19a, 19b . . . Second image
20 . . . Second display unit

The invention claimed is:

1. A terminal device, comprising:
a first plate-shaped rectangular case, that includes a first display unit and a first input unit that detects an operation that is input into a front surface side of the first display unit;
a second plate-shaped rectangular case, that includes a second display unit and a second input unit that detects an operation that is input into a front surface side of the second display unit;
a hinge that couples the first plate-shaped rectangular case and the second plate-shaped rectangular case; and
a control unit,
wherein, in a condition in which the hinge is closed and the second display unit is located on a rear surface side of the first display unit, the control unit displays main information on an upper layer of the first display unit and displays, concurrently with the main information, attachment information that is associated with the main information on a lower layer of the first display unit underlying the main information, and upon the second input unit detecting the operation, the control unit processes the attachment information that is displayed on the first display unit in accordance with the operation detected by the second input unit, and
wherein, in a condition in which the hinge is opened and the first display unit and the second display unit are positioned alongside in a planar manner, the control unit displays the main information and the attachment information on the first display unit and the second display unit, respectively, and upon the second input unit detecting the operation, the control unit processes the attachment information that is displayed on the second display unit in accordance with the operation detected by the second input unit,
wherein when the second input unit has detected a screen switching operation, the control unit switches only the attachment information to an other attachment information while maintaining the display of the main information on the first display unit, and
when the first input unit has detected a screen switching operation, the control unit switches the main information and the attachment information to an other main information and an attachment information associated with the other main information.

2. The terminal device according to claim 1, wherein when the second input unit has detected an operation to move a display area of a display image or has detected an operation to reduce or enlarge the display image, the control unit moves the display area or reduces or enlarges the display image only for the attachment information.

3. The terminal device according to claim 2, wherein if the main information is information showing an individual person, then when the second input unit detects a screen switching operation, the control unit switches to attachment information that contains a human face among the attachment information that is associated with the main information.

4. The terminal device according to claim 2, wherein if group information which shows a group to which the attachment information belongs is given to the attachment information, then when the second input unit detects a screen switching operation, in accordance with the designated group, the control unit switches to attachment information belonging to the group among the attachment information that is associated with the main information.

5. The terminal device according to claim 1, wherein if the main information is information showing an individual person, then when the second input unit detects a screen switching operation, the control unit switches to attachment information that contains a human face among the attachment information that is associated with the main information.

6. The terminal device according to claim 5, wherein if group information which shows a group to which the attachment information belongs is given to the attachment information, then when the second input unit detects a screen switching operation, in accordance with the designated group, the control unit switches to attachment information belonging to the group among the attachment information that is associated with the main information.

7. The terminal device according to claim 1, wherein if group information which shows a group to which the attachment information belongs is given to the attachment information, then when the second input unit detects a screen switching operation, in accordance with the designated group, the control unit switches to attachment information belonging to the group among the attachment information that is associated with the main information.

8. The terminal device according to claim 1, wherein the control unit displays an index instructing that a predetermined program be executed as the main information, and displays a wallpaper image as the attachment information.

9. The terminal device according to claim 1, wherein when the first input unit is currently detecting an operation, if the second input unit detects an operation, the control unit processes the attachment information in accordance with the operation detected by the second input unit.

10. A display control method, carried out by a terminal device that includes a control unit, a first display unit and a first input unit that detects an operation that is input into a front surface side of the first display unit, a second plate-shaped rectangular case that includes a second display unit and a second input unit that detects an operation that is input into a front surface side of the second display unit, and a hinge that couples the first plate-shaped rectangular case and the second plate-shaped rectangular case, said display control method comprising:

- displaying, by operation of the control unit, in a condition in which the hinge is closed and the second display unit is located on a rear surface side of the first display unit, main information on an upper layer of the first display unit, and also displaying, concurrently with the main information, attachment information that is associated with the main information on a lower layer of the first display unit underlying the main information,
- upon detection, at the second input unit, of the operation, processing, by the control unit, the attachment information that is displayed on the first display unit in accordance with the operation detected by the second input unit,
- displaying, by operation of the control unit, in a condition in which the hinge is opened and the first display unit and the second display unit are positioned alongside in a planar manner, the main information and the attachment information on the first display unit and the second display unit, respectively,
- upon detection, at the second input unit, of the operation, processing, by the control unit, the attachment information that is displayed on the second display unit in accordance with the operation detected by the second input unit,
- upon detection, at the second input unit, of a screen switching operation, switching, by the control unit, only the attachment information to an other attachment information while maintaining the display of the main information on the first display unit, and
- upon detection, at the first input unit, of a screen switching operation, switching, by the control unit, the main information and the attachment information to an other main information and an attachment information associated with the other main information.

11. A computer-readable non-transitory medium on which is stored a program that, upon execution by a computer of a terminal device, causes the computer of the terminal device, which includes at least each of a first plate-shaped rectangular case having a first display unit and a first input unit that detects an operation that is input into a front surface side of the first display unit, a second plate-shaped rectangular case having a second display unit and a second input unit that detects an operation that is input into a front surface side of the second display unit, and a hinge that couples the first plate-shaped rectangular case and the second plate-shaped rectangular case, to function as:

- a control unit that,
  - in a condition where the hinge is closed and the second display unit is located on a rear surface side of the first display unit, displays main information on an upper layer of the first display unit, and displays, concurrently with the main information, attachment information that is associated with the main information on a lower layer of the first display unit underlying the main information, and further, in an event where the second input unit detects the operation, the control unit processes the attachment information that is displayed on the first display unit in accordance with the operation detected by the second input unit, and in a condition where the hinge is opened and the first display unit and the second display unit are positioned alongside in a planar manner, displays the main information and the attachment information on the first display unit and the second display unit, respectively, and further, in an event where the second input unit detects the operation, the control unit processes the attachment information that is displayed on the second display unit in accordance with the operation detected by the second input unit,
- wherein when the second input unit has detected a screen switching operation, the control unit switches only the attachment information to an other attachment information while maintaining the display of the main information on the first display unit, and
- when the first input unit has detected a screen switching operation, the control unit switches the main information and the attachment information to an other main information and an attachment information associated with the other main information.

* * * * *